C. H. CONNACHER.
NUT LOCK.
APPLICATION FILED SEPT. 5, 1911.

1,056,323.

Patented Mar. 18, 1913.

WITNESSES:

INVENTOR
Charles H. Connacher
ATTORNEY

UNITED STATES PATENT OFFICE.

CHARLES H. CONNACHER, OF ARLINGTON, WASHINGTON.

NUT-LOCK.

1,056,223.

Specification of Letters Patent.   Patented Mar. 18, 1913.

Application filed September 5, 1911. Serial No. 647,490.

*To all whom it may concern:*

Be it known that I, CHARLES H. CONNACHER, a citizen of the United States, residing at Arlington, in the county of Snohomish, State of Washington, have invented a new and useful Improvement in Nut-Locks, of which the following is a specification.

My invention relates to an improvement in nut-locks and comprises the parts and combination of parts which will be hereinafter described and pointed out in the claims.

It has for its object to provide a nut having a simple and improved locking device whereby the possibility of displacement of the nut by the jarring of machinery or other parts where used is effectively prevented, no matter how severe or prolonged the jars or concussions may be.

The present invention is applicable to various purposes; for illustration, I show in this specification two distinctly different uses. It is capable of use wherever absolute locking is required to hold the nut immovably in engagement with the bolt, and relates particularly to that type of nut-lock in which the nut carries a securing device that automatically locks said parts against reverse rotation.

Figure 1:
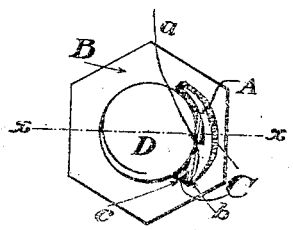
Figure 2:
Figure 3:
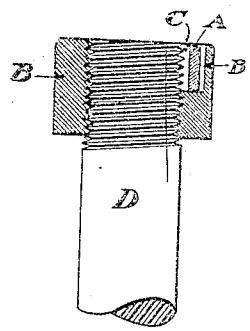
Figure 4:
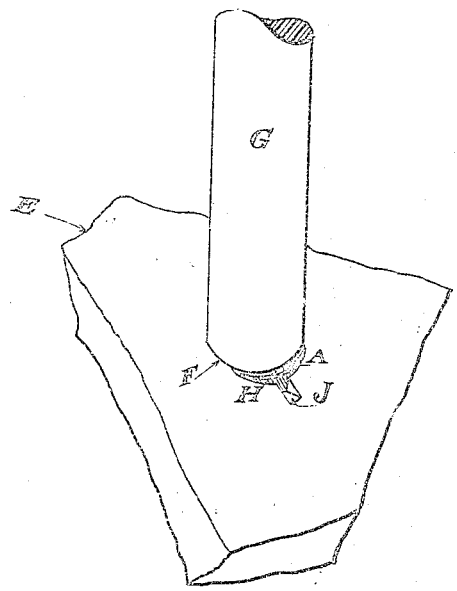
Figure 5:
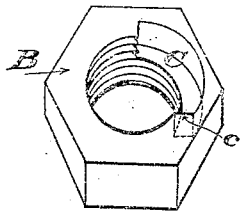

In the accompanying drawings, which form a part of this specification, Figure 1 is a top plan view of a bolt with nut thereon showing my device in the recess of the nut. Fig. 2 is a perspective view of the locking device. Fig. 3 is a vertical view of a bolt with a nut locked thereon, the nut and locking device being shown in section on line $x$, $x$, of Fig. 1. Fig. 4 is a perspective view of a stud-bolt showing my invention applied thereto. Fig. 5 is a threaded nut of ordinary construction recessed to receive the locking device.

Like letters of reference in the accompanying drawings denote the same parts.

In the drawing, A designates a dog or pawl formed from a single piece of metal of suitable thickness with parallel upper and lower flat faces, and having an outer side or surface of circular form and an inner side or surface having practically the shape or configuration of segments of two circles of different diameters overlapped in such manner as to form a sharp transverse rocking or pivotal edge $a$ on one side of the central portion of the dog.

B is a nut of usual construction having a threaded bore whereby it may be screwed upon the threaded end of a bolt; a recess C is formed in the face of the nut practically concentric to its bore and connected therewith, having vertical walls and substantially level base and of a depth coinciding with the thickness of the dog or pawl A, and adapted to receive said dog or pawl.

D represents a bolt of ordinary construction with a threaded end.

E is a plate provided with a threaded bore F adapted to receive a stud-bolt G and and said threaded bore has connected therewith recess H which is practically concentric to said bore; this recess is adapted to receive dog or pawl A; J is a recess or depression in plate E connected with recess H, the purpose of which is to provide for the release of the stud-bolt when occasion so requires, by inserting a strong pointed instrument or other suitable device under the dog and prying it out of its position.

It will be observed that the dog or pawl is eccentric in construction in that rocking edge $a$ thereof is situated from its center and from the axis of the bolt. It will also be noted that the recess C in which the dog is located, is of about the same length as the dog but yet of sufficient dimensions to permit the dog to move freely therein.

The side wall of the recess has practically the same curve as the outer surface of the dog or pawl as it lies in the recess, so that when the nut is moved forward, that is in a direction to the right, the wall of the recess tends to hold head $b$ down to the bolt thereby giving a rearward inclination to the rocking edge $a$ thus enabling the dog to move freely over the threads of the bolt; when, however, the nut is turned in a reverse direction for removal, the end wall of the recess contacts with head $b$ and elevates it thereby causing the dog to act as a strut, and when so positioned the rocking edge $a$ bites the threads of the bolt and the joint diameter of the bolt and dog is increased over their normal diameter, whereby further movement of the nut in a reverse direction is prevented. From this it is apparent that the nut may be locked against reverse movement at any point upon the bolt. The dog has a free sliding movement upon, and is supported by, the bottom of the recess in the nut.

With this explanation of the construction of my device the operation is as follows: The nut B is turned upon the bolt the necessary distance to receive the dog A which is then seated in recess C and the turning of the nut continued in the usual manner until the desired position is reached, the friction of the wall of the recess tending to hold head $b$ down to the bolt which permits the rocking edge $a$ of the dog to ride freely over the threads of the bolt thereby allowing a forward movement of the nut without any impediment. In attempting to reverse the nut, however, the dog is thrown into eccentric relation with the bolt by reason of the end wall of the recess contacting with head $b$ which raises said head and causes rocking edge $a$ to bite the bolt, so that the joint diameter of the dog and bolt is increased beyond their joint diameter when the nut is rotated in a forward direction; consequently, the more force that is applied in attempting to unscrew the nut the greater becomes the pinching of the bolt, and the bolt may be twisted off or the nut or dog be broken before a release be effected.

The many advantages to be derived from the use of my improved device are self-evident from the foregoing description of construction and operation. It is simple in construction and reliable in operation and can be operated readily without the use of any special tool.

Various changes may be made in the details of construction without departing materially from the spirit of the invention as herein disclosed and claimed.

What I claim is—

1. A nut-lock comprising, in combination with a bolt and a nut having a concentric recess formed on one side of its bore and communicating therewith, a separately movable locking member located in the recess and having a rocking edge on one side of its center and parallel to the axis of the bolt.

2. In a nut-lock, the combination with a bolt, of a nut adapted to fit said bolt, said nut having a concentric recess formed in its top face on one side of and communicating with its bore, and a separately movable locking member having a rocking edge on one side of its center located in said recess and adapted to enter the bore when attempt is made to remove the nut.

3. In combination, a threaded bolt, a nut adapted to fit said bolt and having a concentric recess formed in its top face on one side of and communicating with its threaded bore, and a separately movable dog provided with a pivotal transverse edge on its inner face on one side of its center and seated in the recess and adapted to lockingly engage the bolt when attempt is made to rotate the nut in a reverse direction.

4. The combination with a nut having a concentric recess formed on one side of its bore and communicating therewith, of a separately movable locking member provided with a rocking edge on one side of its center and adapted to enter the bore and so positioned in the recess that when the nut is reversed for removal from the bolt it causes the dog to act as a strut thereby preventing the removal of the nut.

5. In combination, a threaded bolt, a nut provided with a concentric recess on one side of its threaded opening and communicating therewith, and a separately movable dog having a rocking edge on one side of its center located in said recess and having both a pivotal and freely sliding movement therein and adapted to enter the bore when attempt is made to remove the nut.

6. A nut-lock comprising, in combination with a bolt and a nut having a concentric recess formed on one side of its bore and communicating therewith, a separately movable locking member located in the recess and having a rocking edge on one side of its center and parallel to the axis of the bolt and so positioned that upon reversing the nut the combined diameter of the bolt and locking member is increased beyond their normal diameters, thereby causing the nut to bind.

7. The combination with a nut having a concentric recess on one side of its bore and communicating therewith, of a separately movable dog provided with a rocking edge on one side of its center and parallel to the axis of the bolt and adapted to enter the bore, and so positioned in the recess as to pass freely over the threads of the bolt in one direction and having a biting resistance when the nut is turned in the opposite direction.

8. A nut-lock comprising, in combination with a bolt and a nut having a recess formed therein concentric to its bore and communicating therewith, said recess having smooth vertical side and end walls and a level base; a separately movable dog having a rocking edge on one side of its center that lies in the general direction of the length of the bolt when located in said recess and adapted to enter the bore and bite the bolt when attempt is made to remove the nut.

9. The combination with a nut having a recess communicating with its bore, said recess having vertical end walls and a base between said end walls practically level, and a vertical side wall concentric with the bore, of a separately movable securing device seated in said recess and provided with a rocking edge on one side of its center in line with the axis of the bolt and so positioned that the nut rotates freely upon the bolt in one direction, but when reversed the securing device frictionally engages the bolt thereby causing the nut to bind.

CHARLES H. CONNACHER.

Witnesses:
 RALPH C. BELL,
 SCHUYLER DURYEE.